(12) United States Patent
Anaya-Dufresne et al.

(10) Patent No.: US 6,646,832 B2
(45) Date of Patent: Nov. 11, 2003

(54) SLIDER FOR LOAD/UNLOAD OPERATION WITH HIGH STIFFNESS AND LOW UNLOAD FORCE

(76) Inventors: Manuel Anaya-Dufresne, 1383 Steelhead Common, Fremont, CA (US) 94536; Pablo G. Levi, 150 Pasito Ter., #610, Sunnyvale, CA (US) 94086

( * ) Notice: Subject to any disclaimer, the term of this patent is extended or adjusted under 35 U.S.C. 154(b) by 208 days.

(21) Appl. No.: 09/772,356

(22) Filed: Jan. 29, 2001

(65) Prior Publication Data

US 2002/0131209 A1 Sep. 19, 2002

(51) Int. Cl.⁷ .................................................. G11B 5/60
(52) U.S. Cl. ........................ 360/236.2; 360/236.1; 360/236.3
(58) Field of Search .................. 360/236.2, 236.1, 360/236.3, 236.5, 236.9

(56) References Cited

U.S. PATENT DOCUMENTS

| | | | | |
|---|---|---|---|---|
| 4,802,042 A | * | 1/1989 | Strom | 360/236.3 |
| 5,200,868 A | | 4/1993 | Chapin et al. | 360/103 |
| 5,377,063 A | | 12/1994 | Taniguchi et al. | 360/103 |
| 5,490,026 A | | 2/1996 | Dorius et al. | 360/103 |
| 5,704,715 A | | 1/1998 | Chang et al. | 384/12 |
| 5,754,367 A | | 5/1998 | Chang et al. | 360/103 |
| 5,768,053 A | | 6/1998 | Yamanaka et al. | 360/103 |
| 5,777,825 A | | 7/1998 | Dorius | 360/103 |
| 5,825,588 A | | 10/1998 | Bolasna | 360/103 |
| 5,889,634 A | | 3/1999 | Chang et al. | 360/103 |
| 5,889,637 A | | 3/1999 | Chang et al. | 360/103 |
| 5,917,679 A | | 6/1999 | Park et al. | 360/103 |
| 5,926,344 A | | 7/1999 | Kimura | 360/103 |
| 5,936,800 A | | 8/1999 | Harris | 360/103 |
| 5,953,181 A | | 9/1999 | Utsunomiya | 360/103 |
| 5,963,396 A | | 10/1999 | Burga et al. | 360/103 |
| 6,021,020 A | | 2/2000 | Itoh et al. | 360/103 |
| 6,137,656 A | | 10/2000 | Levi et al. | 360/235.4 |
| 6,144,528 A | | 11/2000 | Anaya-Dufresne et al. | 360/235.4 |
| 6,417,992 B2 | * | 7/2002 | Sugimoto et al. | 360/236.2 |

* cited by examiner

Primary Examiner—George J. Letscher

(57) ABSTRACT

A disk drive (22) for load/unload applications having an actuator arm (32), a slider (34) and a suspension membrane (48) which attaches the slider (34) to the actuator arm (32). The slider (34) includes a leading edge (50), a trailing edge (52), a number of pads (80, 82) and a cavity (60), which creates a region of sub-ambient pressure (61), including a negative pressure center (62). A load point (64) is formed where the suspension membrane (48) attaches to the slider (34). The negative pressure center (62) is positioned towards the trailing edge (52) relative to the load point (64), such that when upward force (96) is applied to the slider (34) at the load point (64), a moment (98) is produced which raises the leading edge (50), allowing increased air flow into the cavity (60), which diminishes the sub-ambient pressure (61), and allows the arm (34) to be raised without damaging the suspension membrane (48).

Also, a slider (34) contoured for use in a load/unload disk drive (22) and a method for disengaging a slider (34) having high stiffness from a disk surface (26) without damaging a disk drive suspension membrane (48).

27 Claims, 7 Drawing Sheets

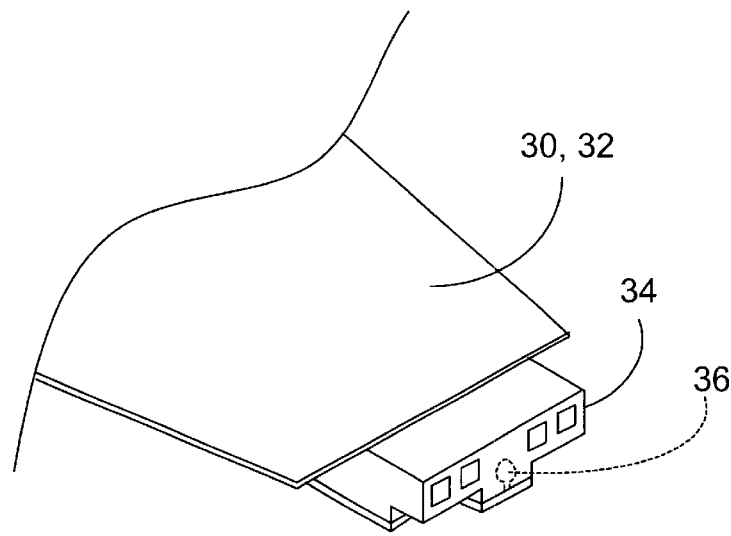
FIGURE 2
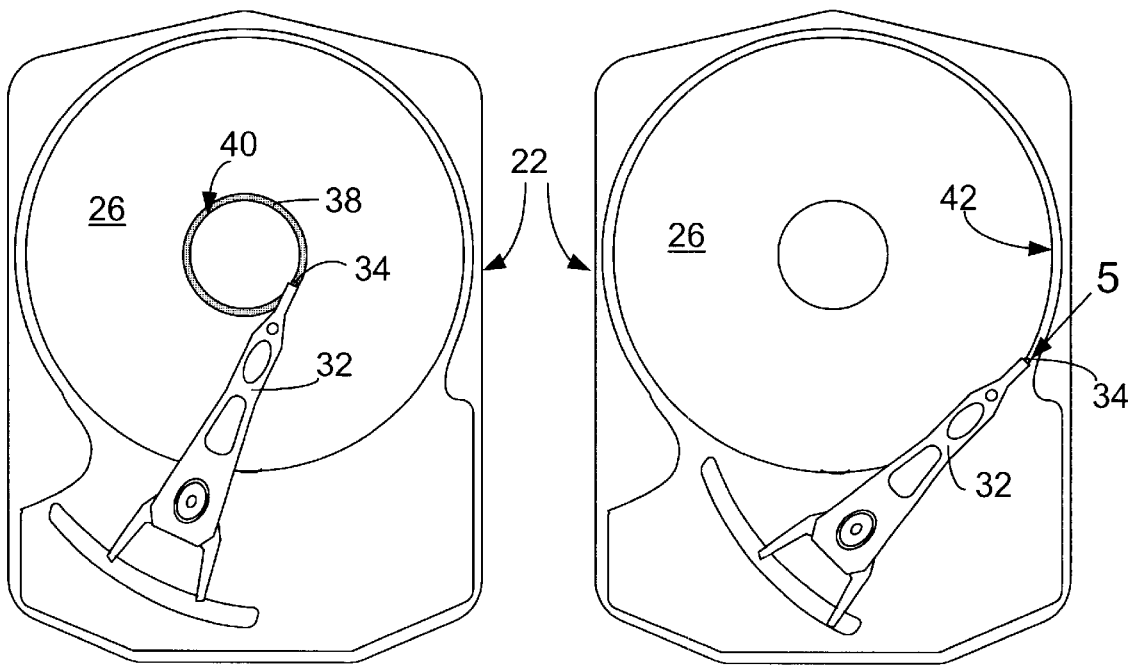
FIGURE 3
(Prior art)
FIGURE 4

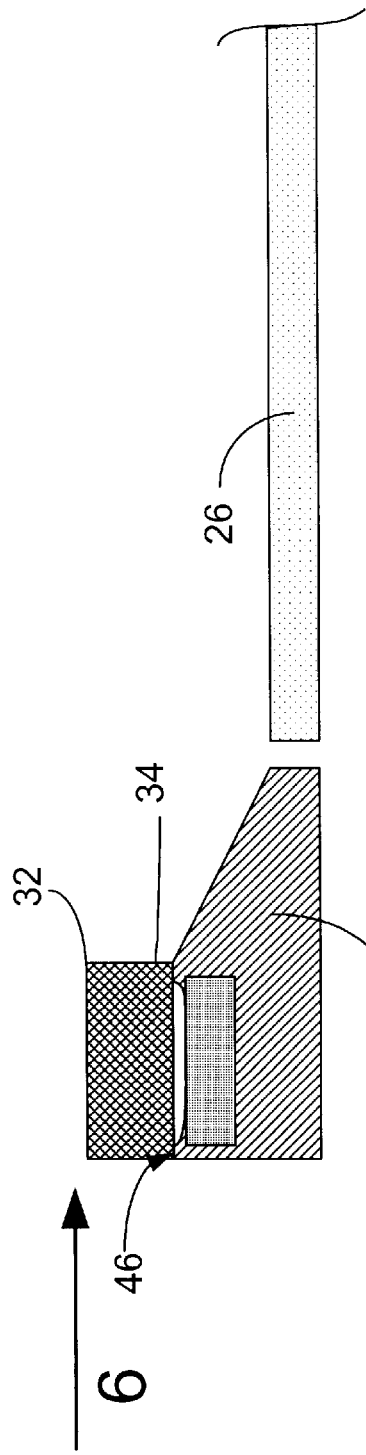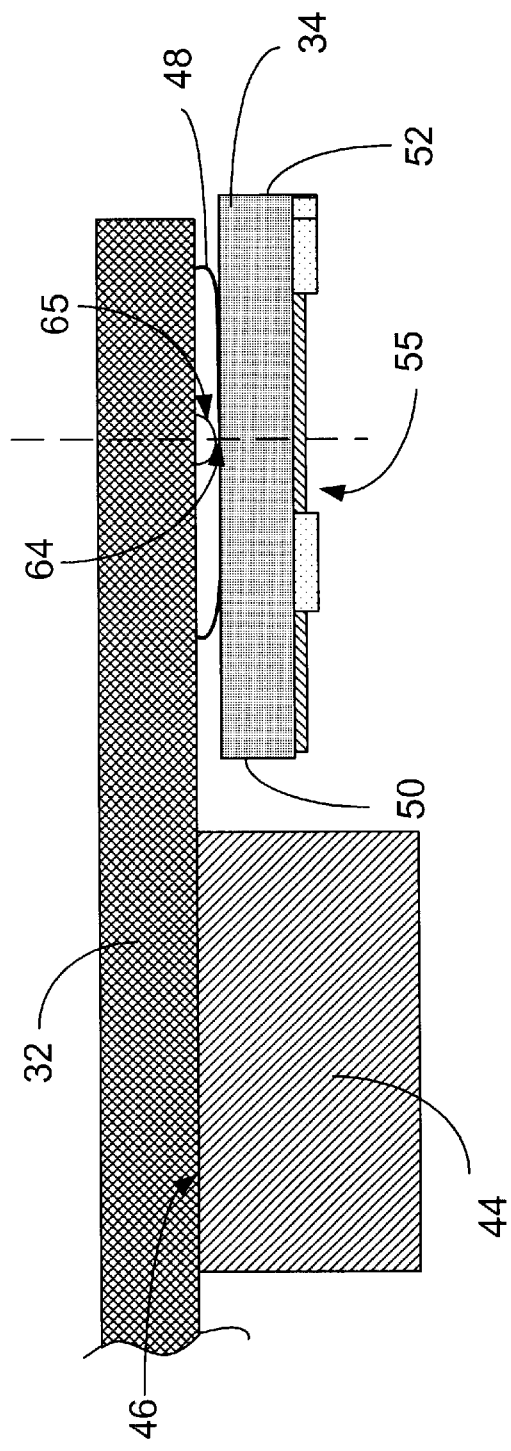

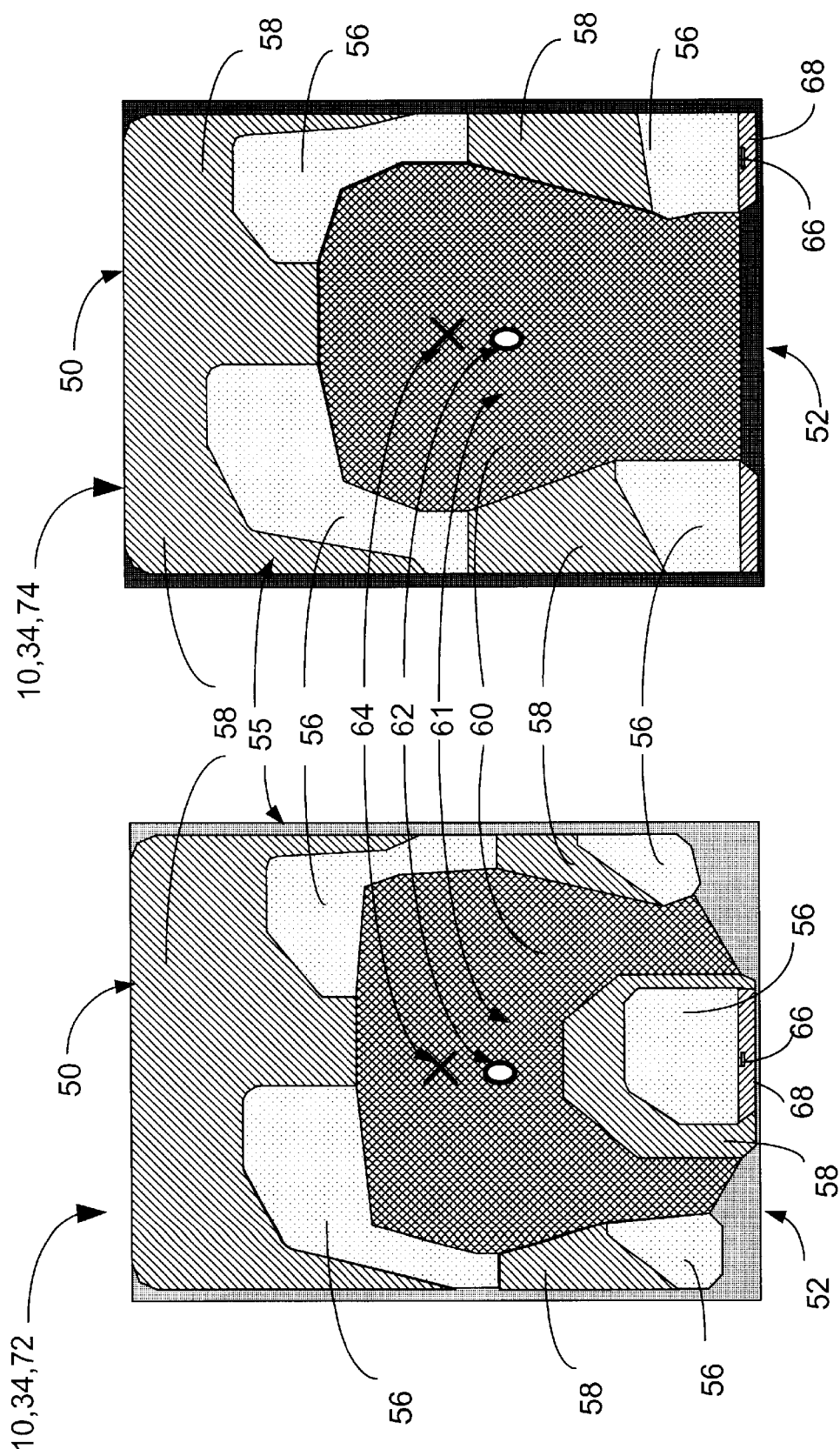

SLIDER FOR LOAD/UNLOAD OPERATION WITH HIGH STIFFNESS AND LOW UNLOAD FORCE

TECHNICAL FIELD

The invention is related to the field of air bearing sliders for use in magnetic head assemblies.

BACKGROUND ART

In a computer disk drive, data is stored and retrieved by using one or more magnetic heads positioned close to a rotating disk containing magnetic material which records the information. The write head operates to write data onto the disk by aligning magnetic poles of the magnetic material. A read head reads data by sensing the alignment of these poles. Typically, these are combined in a read/write head containing both devices. Because the magnetic fields are very small, it is important that the read and/or write head is located very near the surface of the disk. The closer the head can be placed to the disk surface, the greater the storage capacity of the disk can be. Heads are typically mounted to air bearing sliders which are specifically shaped so that when placed into an air-stream existing close to the surface of a rotating disk, the movement of the disk relative to the slider will provide a lifting force to cause it to fly above the disk.

Magnetic heads are usually mounted to sliders either at a position near the center of the back end of the slider, or at the end of one or both of the side rails of the slider. The front end of the slider is typically higher than the rear end, which aids in establishing air flow into regions of positive pressure, which act to lift the slider. This also allows the heads to be positioned closer to the disk surface. The lower surface of the slider is generally known as the Air Bearing Surface (ABS), and the shape of this ABS is crucial to several different parameters which affect slider and head performance.

It is very important that the heads be maintained at a very precise and unvarying distance from the surface of the disk. Usually, the slider and magnetic head assembly is bonded to an actuator arm which allows the slider to maintain a desired position relative to the disk surface. The actuator arm also enables movement of the slider across the disk surface to precise positions over individual data tracks of the disk.

Generally, as the airflow is increased, the slider will produce greater lift and thus raise to a higher position above the disk surface. This causes the slider to vary its height as its location along the radius of the disk is changed. The closer to the center of the disk the slower the airflow, the lower the lift force and thus the lower the slider will fly. The closer to the outer edge the slider is, the faster the airflow, the greater the lift force and the higher the slider will fly. However, fluxuations in flying height are undesirable as a more constant flying height would allow the magnetic head to be positioned closer to the disk surface regardless of its radial location above the disk.

In order to maintain a more constant flying height, it has become the practice to contour the ABS so as to create regions of negative pressure, that is areas of sub-ambient pressure, which act to create a balancing "suction" force which draws the slider downwards towards the disk surface. These are generally formed by creating cavities into which the air-streams can accelerate, thus causing a localized drop in pressure in these cavity areas. These negative pressure areas can serve to counter the forces generated by the positive pressure areas, and thus balance the forces at some equilibrium. Since the negative pressure forces can be expected to increase with increased air-flow, this is an effective way of countering the increase in positive pressure caused by increased air flow at the outer radius of the disk.

The use of negative pressure areas have several other advantages as well. Variations in the loading of the slider will also affect the flying height. The degree to which the flying height will be affected by variations in loading is referred to as load sensitivity. A slider which provides a lower load sensitivity is said to have high vertical stiffness. There can also be variations in air pressure, as for instance, when a slider is operated at high altitudes where the air is thinner and the positive pressure lifting force is decreased. This variation in performance with variations in altitude may be termed altitude sensitivity. A slider with high stiffness also generally produces less altitude sensitivity. The use of negative pressure zones in the ABS is an effective way of producing high stiffness, which is beneficial on both accounts.

In a typical alternate mode of operation, the read/write head is operated by a method known as Contact Start/Stop (CSS). In this method, the slider is parked in a landing zone near the inner diameter of the disk. The actuator arm moves the slider to this landing zone, and then the rotational speed of the disk slows gradually. The positive pressure at the ABS gradually decreases until the slider comes to rest, contacting the disk surface.

Recently, another mode of operation has been developed, called Load/Unload. In this mode, when the head is to be parked, as on start-up or power-down, the slider is carried by the actuator to the outer edge of the disk. There is a small ramp, up which the actuator arm is carried, and then the arm comes to rest a short distance above the disk surface. The slider thus never contacts the disk surface, and a certain amount of wear on the slider is thus avoided.

There have been certain problems with this mode of operation, however. The parked position of the arm is physically elevated about the level of the disk, so it is necessary to lift the arm, including the slider, from proximity with the disk. The slider is attached to the arm by a flexible suspension membrane, which, in order to minimize weight and provide flexibility, is made to be very thin. In sliders with an ABS which uses negative pressure areas to maintain a constant fly height, the negative pressure naturally opposes the lifting of the slider from the disk surface. If the membrane is fragile enough, or if the negative pressure force is great enough, the membrane can be torn or damaged as the slider is pulled away from the disk surface.

Thus there is a need for a slider having an air-bearing surface including negative pressure areas for stability, but which is more easily disengaged from proximity to the disk surface without risk of damage to actuator-arm components.

SUMMARY OF THE INVENTION

The slider of the present invention is configured to be used with load/unload drives, and to aid in disengagement from the disk surface during unload operations. The slider includes sub-ambient, or negative pressure zones having a pressure center which is located towards the trailing edge of the slider compared to the load point. This allows the creation of a moment about the load point which acts to create a rotation about the load point. This rotation tends to lift the leading edge away from the disk surface. More air is then funneled into the gap between the air bearing surface and the disk surface. The surface of the negative pressure cavity or cavities is also brought away from the disk surface disrupting the negative pressure and releasing the slider from engagement with the disk surface. Once the negative pressure has been disrupted, the force opposing the lifting of the arm is reduced or dispelled, and the arm can be lifted into the load/unload ramp without damage to the actuator arm or its components.

DISCLOSURE OF INVENTION

Accordingly, it is an object of the present invention to provide a slider which has high stiffness, and thus good flying height stability, low load sensitivity, and low altitude sensitivity.

Another object of the invention is to provide a slider which can be used with load/unload disk drive operations.

And another object of the invention is to provide a slider which can be disengaged from the disk surface without causing damage to the actuator arm suspension membrane.

Briefly, one preferred embodiment of the present invention is a disk drive having an actuator arm, a slider and a suspension membrane which attaches the slider to the actuator arm. The slider includes a leading edge, a trailing edge, a number of pads and a cavity, which creates a region of sub-ambient pressure, including a negative pressure center. A load point is formed where the suspension membrane attaches to the slider. The negative pressure center is positioned towards the trailing edge relative to the load point, such that when upward force is applied to the slider at the load point, a moment is produced which raises the leading edge, allowing increased air flow into the cavity, which diminishes the sub-ambient pressure, and allows the arm to be raised without damaging the suspension membrane.

An advantage of the present invention is that the slider of the present invention has a very low standard deviation in flying height.

Another advantage of the invention is that the slider of the present invention has very low load sensitivity.

And another advantage of the invention is that the slider of the present invention has very low altitude sensitivity.

A further advantage of the present invention is that the slider produces a relatively large negative pressure force, and a comparatively small unload force.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which:

FIG. 2 illustrates a simplified isometric detail view of the slider;

FIG. 3 illustrates a simplified plan view of a disk drive, which uses Contact Start/Stop parking;

FIG. 4 shows a simplified front plan view of a disk drive, which uses load/unload parking;

FIG. 5 shows a side view of the unload/unload disk drive in parked position;

FIG. 6 illustrates a simplified side view diagram of the actuator arm, slider and suspension membrane;

FIG. 7 shows a bottom plan view of a slider having a center-mounted sensor;

FIG. 8 shows a bottom plan view of a slider having a side-mounted sensor;

BEST MODE FOR CARRYING OUT THE INVENTION

Figure 1:
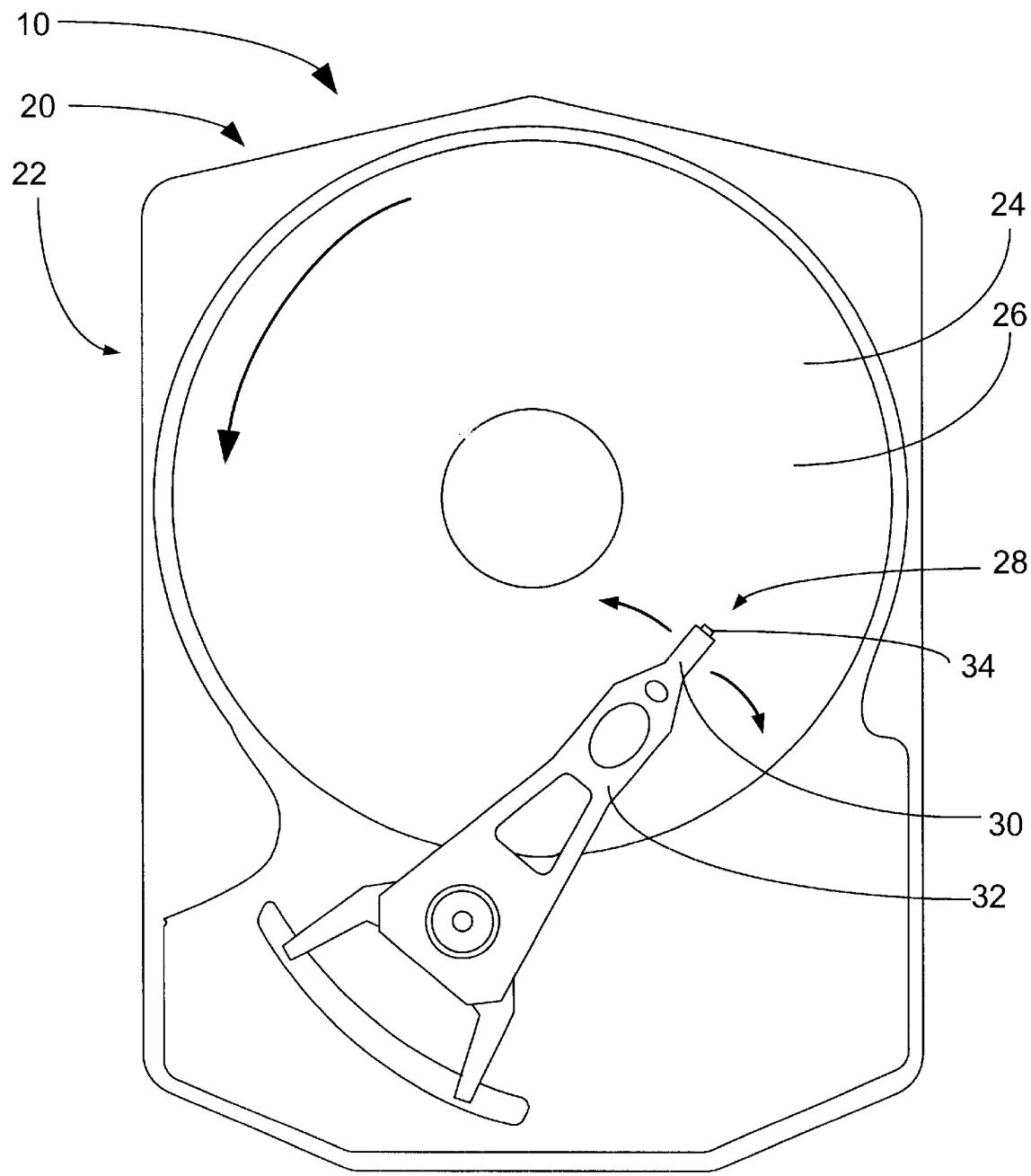
FIG. 1 shows a simplified top plan view of a magnetic storage device.

A preferred embodiment of the present invention is a disk drive slider having high stiffness and low unload force. As illustrated in the various drawings herein, and particularly in the view of FIG. 1, a form of this preferred embodiment of the inventive device is depicted by the general reference character 10.

FIG. 1 shows a simplified top plan view of a magnetic storage device 20, in this case a hard disk drive 22, which generally includes a magnetic storage medium 24, specifically a hard disk 26. A data read/write device 28 includes an actuator 30 having an arm 32, which supports a slider 34.

FIG. 2 illustrates a simplified isometric detail view of the slider 34 showing the arm 32 and a magneto-resistive head 36, which has been embedded in the slider 34.

FIG. 3 (prior art) illustrates a disk drive 22, which uses Contact Start/Stop parking. The arm 32 is shown positioned over a landing zone 38, located near the inner radius 40 of the disk 26. As the name suggests, the slider 34 actually contacts the surface of the disk 26 when it is parked. Upon powering up, airflow is generated which supports the slider 34 so that it flies above the disk surface 26. Upon powering down, the air-flow gradually diminishes so that the slider 34 comes to rest in the landing zone 38.

In contrast, FIGS. 4–6 show a disk drive 22, which uses load/unload parking. When parking, the arm 32 moves to the outer radius 42, where it enters a ramp 44, and comes to rest atop a platform 46. Preferably the arm 32 rests on the platform 46 and the slider 34 is suspended without contacting the ramp 44 or platform 46.

FIG. 5 shows a side view of the unload/unload disk drive in parked position in more detail, as seen from the direction of arrow 5, in FIG. 4. The arm 32 is shown resting atop the platform 46, which is elevated relative to the disk surface 26. No attempt has been made to draw the elements to scale in this or the following figure.

FIG. 6 illustrates a simplified diagram of the actuator arm 32, slider 34 and suspension 48 as seen from the viewpoint of the arrow labeled 6, in FIG. 5. The slider 34 is shown attached to the arm 32 by a suspension membrane 48. The slider 34 has a leading edge 50 and a trailing edge 52, the leading edge 50 being located relative to the air stream flow 54, the leading edge 50 contacting incoming airflow first. The lower surface of the slider 34 is the Air-Bearing-Surface or ABS 55.

The suspension membrane 48 is flexible and very thin, and is easily damaged if force is exerted to pry the slider 34 away from the arm 32. The membrane 48 has a load point 64, which is the point of action of forces directed at either pressing downwards upon the slider 34 or of lifting the slider 34 upwards. This load point 64 is symbolized by a dashed line in this side view. In order to establish the exact position of the load point 64, a dimple 65 may be provided as a projection from the actuator arm 32 to the slider 34. The load point is thus fixed in a position, so that its relative position to the negative pressure center, discussed below, is easily established.

FIG. 7 shows a bottom plan view of a slider 34 having a sensor 66, which is center-mounted. FIG. 8 shows a bottom plan view of a slider 34 in which the sensor 66 is mounted on a side rail. In both figures, features which are common to both will be described by a common element number whenever possible.

In FIGS. 7 and 8, areas have been shaded as to relative elevations of the areas. The lightest areas are of highest elevation, these being the areas which create positive pressure in the air-bearing surface 55. They are generally referred to as "pads" 56, and their structure will be discussed below in detail in regards to FIGS. 9 and 10. The next lighter areas, which are shaded with diagonal lines, are shallow recessed areas 58, which are recessed at generally a uniform depth of 2–15 micro-inches relative to the pads 56. The darkest areas, shaded with cross-hatching, are the cavity regions 60, in which allowing the air stream to accelerate into more open areas creates a region of sub-ambient air pressure 61. These cavities 60 are also generally at a uniform depth of 40–130 micro-inches below the pads 56. The center of the negative pressure 62 is symbolized by an oval, and the load point 64 is symbolized by an "X". It is to be noted that the negative pressure center 56 is located further towards the trailing edge 52 than the load point 64.

The sensor 66 in FIG. 7 is shown mounted on a central platform 68 at the trailing edge 52 of the slider 34. The sensor 66 in FIG. 8 is shown mounted on a side platform 68 at the trailing edge 52 of the slider 34. For this reason the embodiment in FIG. 7 shall be termed the central sensor slider 72, and the embodiment in FIG. 8 shall be termed the siderail sensor slider 74, a term which shall be used for a slider which is mounted on either the right or left side end. The contours of the pads 56 and cavities 60 have been adjusted in each of these embodiments to create the most favorable air flow, but in each case, it is to be noted that the negative pressure center 62 is located further towards the trailing edge 52 than the load point 64.

Figure 9:
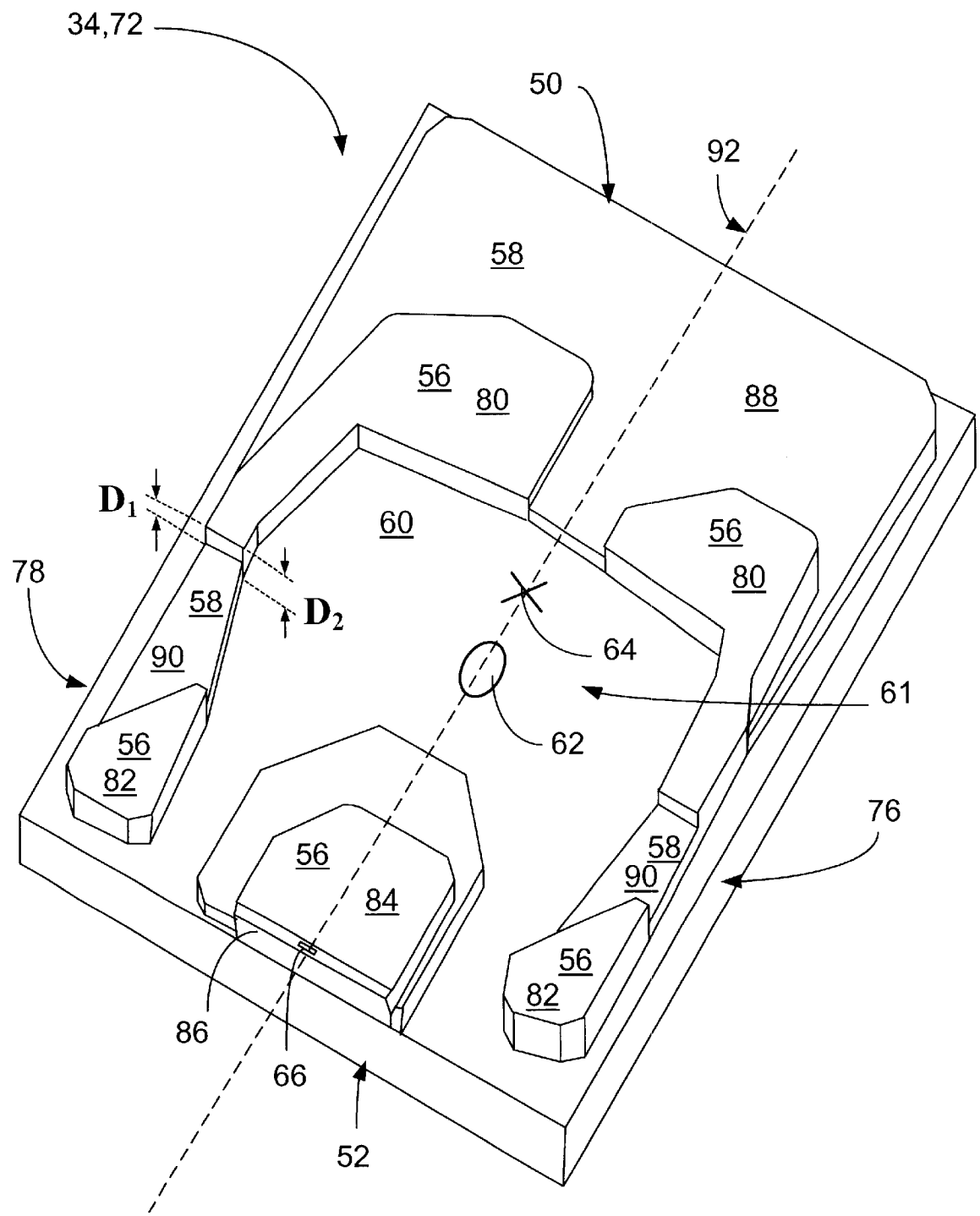
FIG. 9 shows a bottom isometric view of a slider having a center-mounted sensor.
Figure 10:
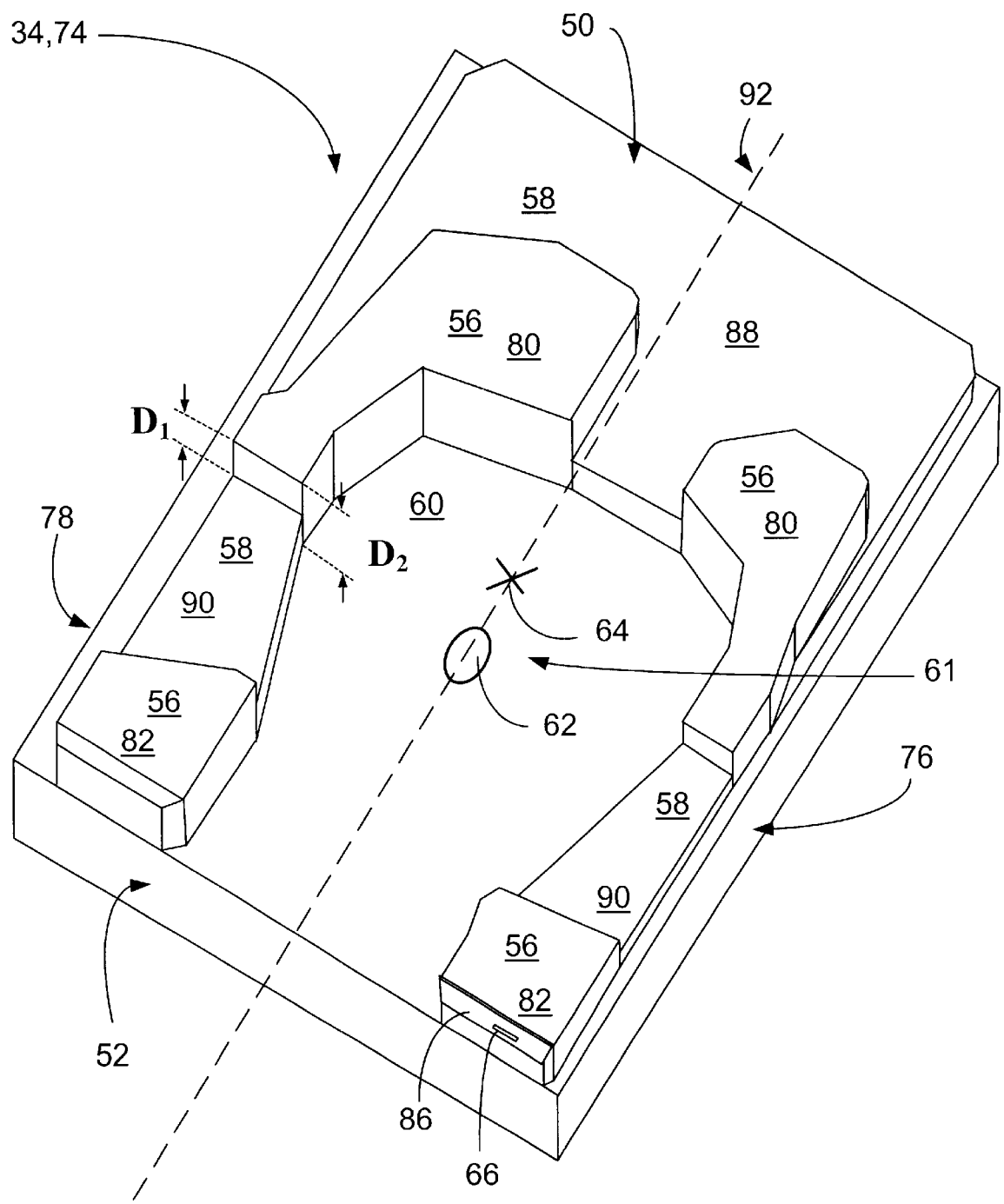
FIG. 10 shows a bottom isometric view of a slider having a side-mounted sensor.

FIGS. 9 and 10 show bottom isometric views of the same central sensor slider 72 and siderail sensor slider 74 of FIGS. 7 and 8. Once again, elements which are common to both embodiments will be called out by the same element numbers.

As described above, the sliders 72, 74 each have a leading edge 50, a trailing edge 52 and a right side 76 and a left side 78 between the leading 50 and trailing edges 52, a pair of forward pads 80 positioned toward the leading edge 50, and rearward pads 82 positioned toward trailing edge 52. The central sensor slider 72 (FIG. 9) also includes a center pad 84 positioned near the trailing edge 52, whereas the siderail sensor slider 74 (FIG. 10) preferably has none. The sensor 66 is included in a sensor housing 86, which in the central sensor slider 72 is located at the center pad 84, whereas in the siderail sensor slider 74, the sensor 66 and sensor housing 86 are located at one of the rearward pads 82. In FIG. 10, the sensor 66 is at the right hand rearward pad 82, although, as referred to above, it could be located at either rearward pad.

As described above, the sliders 72, 74 are configured with shallow recesses 58, the larger of which forms a forward recess area 88, and there are preferably smaller side recesses 90, which function somewhat as the siderails in older slider designs. There is a cavity portion 60, which could actually be several cavities, which is at a comparatively lower depth than the shallow recesses 58, and it is in these areas that sub-ambient or negative pressure is developed. The depth of the shallow recesses 90 is shown as $D_1$, and as mentioned above, is preferably in the range of 2–13 micro-inches, relative to the pads. The depth of the cavity 60 is shown as $D_2$, preferably in the range of 40–85 micro-inches, relative to the pads 56.

The load point 64 is again illustrated with an "X", as being the projection of the line of force where the arm contacts the slider. The negative pressure center 62 is also depicted with an oval, both being shown as being aligned on a longitudinal axis line 92, although this is by no means a requirement. The negative pressure center 62 is the cumulative point of action of the distributed forces of the sub-ambient air pressure throughout the cavity 60. Again, it is to be noted that the negative pressure center 62 is located further towards the trailing edge 52 than the load point 64.

Figure 11A:
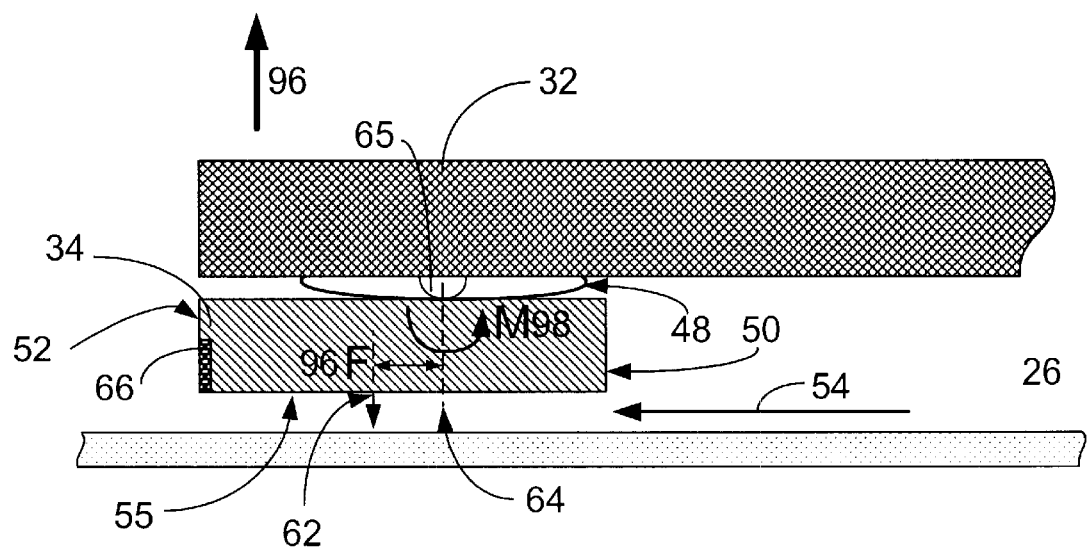
FIGS. 11A and B show side plan views of a slider in the several steps in the process of being disengaged from a disk surface.

The importance of the relative positions of the negative pressure center 62 and the load point 64 are illustrated in FIGS. 11A and B, which show a simplified side plan views of a slider 34 in the several steps in the process of being disengaged from a disk surface 26. FIG. 11A shows the slider 34 while in flying operation, at the point that the arm 32 is beginning disengagement from the disk 26, as indicated by the arrow 96. The actuator arm 32, and suspension membrane 48 are shown. Air-stream flow 54 is indicated by the arrow, as it flows past the leading edge 50, between the air-bearing surface 55 and the disk surface 26, and exits from the trailing edge 52. The sensor 66 is located on the trailing edge 52, as indicated. The line of action of the load point 64 is shown as a dashed line, and the line of action of the negative pressure center 62 is also shown. An optional dimple 65 is also shown, which serves to precisely locate the load point 64, as discussed above.

As the arm begins to lift, the force F 96 directed downwards at the negative pressure center 62 causes a moment M 98 to be generated around the contact point of the membrane 48 and the slider 34. This moment 98 will be the product of the force F 96 times the length of the moment arm separating the load point 64 and the negative pressure center 62. This moment 98 tends to make the slider rotate in the direction of the moment arrow 98.

Figure 11B:
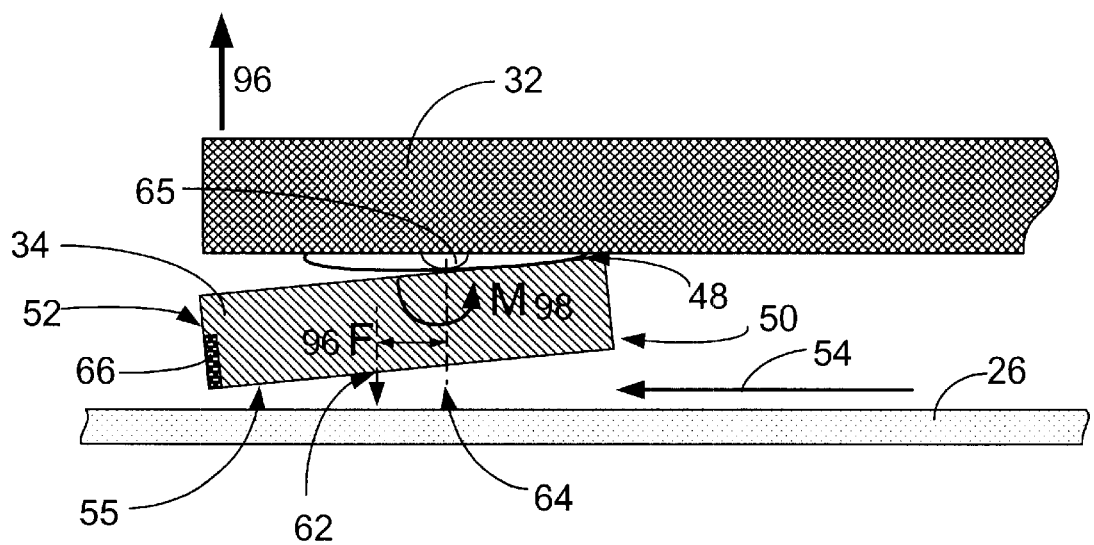

In FIG. 11B, the effect of the rotation due to the moment 98 is shown. The leading edge 50 has lifted away from the disk surface 26. The airflow 54 is thus directed differently and the negative pressure is diminished, somewhat in the same manner of a suction cup, when one edge of the cup is pried up. When the negative pressure has been dispersed, then the arm 32 can be easily lifted without risking damage to the membrane 48. The arm 32 can then be safety raised up the ramp 44 (see FIG. 5) and parked.

The present invention 10, thus creates increased negative pressure for increased stiffness and stability without risking damage to the suspension membrane 48. The following table summarizes several performance parameters for a high stiffness slider of the present invention when used in a typical disk drive rotating at 7200 RPM and at a nominal flying height of 1.0 micro-inches ($\mu"$):

| Performance parameter | Low stiffness design | High stiffness design |
| --- | --- | --- |
| Flying Height standard deviation ($\mu$") | 0.10 | 0.08 |
| 10,000 feet height loss ($\mu$") | 0.15 | 0.13 |
| OD subambient force (grams) | 2.5 | 3.25 |
| Maximum unload force (grams) | 0.4 | 0.48 |
| Step depth sensitivity ($\mu$"/$\mu$") | 0.16 | 0.11 |

The present invention thus shows improved stability in the flying height, less altitude sensitivity, and produces an increased sub-ambient force generally, and in particular at the outer diameter position of the disk, as shown by the OD (Outer Diameter) sub-ambient force in the table above, while increasing the maximum unloading force only very slightly. The parameter of step depth sensitivity refers to the sensitivity in the flying height related to the changes in depth of the recessed areas, indicating that there is flying height will be less vulnerable to small variations in manufacturing tolerances.

A crucial improvement in these figures concerns the maximum unload force, which in a low stiffness design is listed as 0.4 grams, and 0.48 grams for the present high stiffness design, for which the negative pressure center is positioned towards the trailing edge compared to the load point. The inventors estimate that without this feature, which allows for reduced unloading force of the slider, for an outer diameter subambient force of 3.25 grams, the maximum unload force would be approximately 2 grams. A force of 2 grams which opposes unloading of the slider could very well damage the support membrane.

The present invention produces a subambient force at the outer diameter of the disk, where the rotational velocity and accompanying sub-ambient force may be expected to be at a maximum, in the range of 3–4 grams for a maximum unload force of 0.4–0.6 grams.

Therefore, the present invention allows for a substantial increase in subambient force with accompanying improved stability, with only a very slight increase (0.08 grams in the table above) in the maximum unload force.

As referred to above in describing FIGS. 9 and 10, the negative pressure center 62 is shown to be substantially aligned on the same longitudinal axis line 92 as the load point 64. This substantial alignment may be preferred so that there is less generation of secondary moments which would cause tilting or rolling of the slider 34 from side to side during the lifting process. However, alignment of the negative pressure center 62 and the load point 64 is not required, as long as the negative pressure center 62 lies towards trailing edge 52, relative to the load point 64, thus creating the desired moment 98 (see FIGS. 11A and B).

While various embodiments have been described above, it should be understood that they have been presented by way of example only, and not limitation. Thus, the breadth and scope of the invention should not be limited by any of the above described exemplary embodiments, but should be defined only in accordance with the following claims and their equivalents.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A slider for disk drive load/unload operations, the slider being attached to an actuator arm, the slider having an air-bearing surface comprising:
   a leading edge;
   a trailing edge;
   forward pads;
   rearward pads;
   at least one cavity, formed between said forward pads and said rearward pads, which creates a region of sub-ambient pressure, said region having a negative pressure center;
   a load point being formed at the point where the load of said actuator arm contacts said slider;
   and said negative pressure center being positioned towards said trailing edge relative to said load point.

2. The slider as recited in claim 1, further comprising:
   a plurality of shallow recesses.

3. The slider as recited in claim 2, wherein:
   the depth of said plurality of shallow recesses is in the range of 2–15 micro-inches, relative to the pads.

4. The slider as recited in claim 1, wherein:
   The depth of said at least one cavity is in the range of 40–130 micro-inches, relative to said forward and rearward pads.

5. The slider as recited in claim 1, wherein:
   said negative pressure center and said load point are substantially aligned on a longitudinal axis.

6. The slider as recited in claim 1, wherein said slider is a central sensor slider.

7. The slider as recited in claim 1, wherein said slider is a siderail sensor slider.

8. The slider as recited in claim 1, further comprising a dimple, which serves to locate the load point.

9. A disk drive having an actuator arm, a slider and a suspension membrane which attaches the slider to the actuator arm, and a data storage disk having an outer diameter, wherein:
   said slider includes a leading edge, a trailing edge, a plurality of pads and at least one cavity, which creates a region of sub-ambient pressure, said region including a negative pressure center;
   a load point being formed where said suspension membrane attaches to said slider;
   said negative pressure center being positioned towards said trailing edge relative to said load point, such that when upward force is applied to said slider at said load point, a moment is produced which raises said leading edge, allowing increased air flow into said at least one cavity, which diminishes said sub-ambient pressure, and allows said arm to be raised without damaging said suspension membrane.

10. The disk drive as recited in claim 9, wherein the slider further comprises:
    a plurality of shallow recesses.

11. The disk drive as recited in claim 10, wherein:
    the depth of said plurality of shallow recesses is in the range of 2–15 micro-inches, relative to the pads.

12. The disk drive as recited in claim 9, wherein:
    the depth of said at least one cavity is in the range of 40–130 micro-inches, relative to the pads.

13. The disk drive as recited in claim 9, wherein:
    said negative pressure center and said load point are substantially aligned on a longitudinal axis.

14. The disk drive as recited in claim 9, wherein said slider is a central sensor slider.

15. The disk drive as recited in claim 9, wherein said slider is a siderail sensor slider.

16. The disk drive as recited in claim 9, further comprising a dimple, which serves to locate the load point.

17. The disk drive as recited in claim 9, wherein:
said slider produces a subambient force at the outer diameter in the range of 3 to 4 grams for a maximum unload force 0.4 to 0.6 grams.

18. A method of creating a slider having high stiffness and low unload force in a load/unload disk drive having an actuator arm, and a support membrane which attaches the slider to the actuator arm, comprising the steps of:
A) providing a slider having an air-bearing surface which includes a leading edge, and a trailing edge;
B) contouring said air-bearing surface to create a plurality of pads and at least one cavity, which creates a region of sub-ambient pressure for creating high stiffness, said region including a negative pressure center;
C) positioning a load point where said support membrane attaches to said slider, said load being positioned towards said leading edge relative to said negative pressure center; and
D) creating a moment when upward force is applied to said slider at said load point, which raises said leading edge, allowing increased air flow into said at least one cavity, which diminishes said sub-ambient pressure, and allows said actuator arm to be raised without damaging said support membrane.

19. The method as recited in claim 18, wherein said step of contouring said air-bearing surface of said slider includes creating a plurality of shallow recesses.

20. The method as recited in claim 19, wherein said step of creating a plurality of shallow recesses includes creating the depth of said plurality of shallow recesses to be the range of 2–15 micro-inches, relative to the pads.

21. The method as recited in claim 18, wherein said step of contouring said air-bearing surface of said slider includes creating the depth of said at least one cavity to be in the range of 40–130 micro-inches, relative to the pads.

22. A method of disengaging a slider from a disk surface, said slider having high stiffness by the inclusion of at least one subambient pressure region within at least one cavity formed in the air-bearing surface of said slider, said slider further having a leading edge, a trailing edge, a plurality of pads, and being attached to an actuator arm by a support membrane, the method comprising the steps of:
A) contouring said air-bearing surface such that said at least one region of sub-ambient pressure has a negative pressure center which will be positioned towards said trailing edge relative to a load point where said support membrane attaches to said slider; and
B) creating a moment when upward force is applied to said slider at said load point, which raises said leading edge, thus diminishing said sub-ambient pressure, and allowing said slider to be raised from engagement with said disk surface without damage to said support membrane.

23. The method as recited in claim 22, wherein said step of contouring said air-bearing surface of said slider includes creating a plurality of shallow recesses.

24. The method as recited in claim 23, wherein said step of creating a plurality of shallow recesses includes creating the depth of said plurality of shallow recesses to be the range of 2–15 micro-inches, relative to the pads.

25. The method as recited in claim 22, wherein said step of contouring said air-bearing surface of said slider includes creating the depth of said at least one cavity to be in the range of 40–130 micro-inches, relative to the pads.

26. A method of disengaging a slider from a disk surface, said slider having high stiffness by the inclusion of subambient pressure regions having a negative pressure center within at least one cavity formed in the air-bearing surface of said slider, said slider further having a leading edge, a trailing edge, and being attached to an actuator arm by a support membrane, the method comprising the steps of:
A) positioning a load point relative to said slider, said load point being positioned towards said leading edge relative to said negative pressure center;
B) creating a moment when upward force is applied to said slider at said load point, which raises said leading edge, allowing increased air flow into said at least one cavity, which diminishes said sub-ambient pressure, and allows said actuator arm to be raised without damaging said support membrane.

27. A method of creating low unload force in a slider used in load/unload operations from a disk surface, said slider having high stiffness by the inclusion of at least one subambient pressure region within at least one cavity formed in the air-bearing surface of said slider, said slider further having a leading edge, a trailing edge, and being attached to an actuator arm by a support membrane, the method comprising the steps of:
A) contouring said air-bearing surface such that said at least one region of sub-ambient pressure has a negative pressure center which will be positioned towards said trailing edge relative to a load point where said support membrane attaches to said slider; and
B) creating a moment when upward force is applied to said slider at said load point, which raises said leading edge, thus diminishing said sub-ambient pressure, and allowing said slider to be raised from engagement with said disk surface without damage to said support membrane.

* * * * *